United States Patent [19]

Sedlock

[11] 4,121,483
[45] Oct. 24, 1978

[54] AIRCRAFT FLIGHT CONTROL SYSTEM

[75] Inventor: Albert Raymond Sedlock, Shelton, Conn.

[73] Assignee: United Technologies Corporation, Hartford, Conn.

[21] Appl. No.: 767,275

[22] Filed: Feb. 10, 1977

[51] Int. Cl.² .......................................... G05G 11/00
[52] U.S. Cl. .................................. 74/479; 64/28 R; 137/71; 416/2; 416/114
[58] Field of Search .................. 74/479, 583, 584; 137/71; 64/28 R; 416/2, 114

[56] References Cited

U.S. PATENT DOCUMENTS

| 1,311,774 | 7/1919 | Ritter | 137/71 |
| 3,103,004 | 9/1963 | Murray | 64/28 R |
| 3,119,636 | 1/1964 | Kummerman | 64/28 R |
| 3,128,738 | 4/1964 | Farrington et al. | 74/479 |

Primary Examiner—Benjamin W. Wyche
Assistant Examiner—Wesley S. Ratliff, Jr.
Attorney, Agent, or Firm—Vernon F. Hauschild

[57] ABSTRACT

An aircraft flight control including a linkage system having a walking beam to which control inputs are imparted and from which a control output is taken and having anti-jamming and over-control abatement provisions.

6 Claims, 4 Drawing Figures

4,121,483

AIRCRAFT FLIGHT CONTROL SYSTEM

The invention herein described was made in the course of or under a contract or sub-contract thereunder, with the Department of the Navy.

BACKGROUND OF THE INVENTION

1. Field of Invention

This invention relates to aircraft flight control systems and more particularly to such systems including a walking beam in its control linkage system and with provisions for imparting a pilot input and at least one other input to the walking beam so as to produce an output control signal therefrom and with provisions to permit the pilot to continue controlling the aircraft through the walking beam should one or more of the other input controls to the walking beam become inoperative or jammed, and also including mechanism to prevent the pilot from imparting an over-control to the aircraft in the process of initially controlling the aircraft with the other control input to the walking beam jammed.

2. Description of the Prior Art

In the aircraft flight control art, it is known to include walking beams in the flight control linkage system and to impart both pilot controlled and other controlled input signals thereto, and to fabricate the walking beam in two pieces joined by a shear pin so that the walking beam normally operates as a unitary beam and so that, in response to pilot input force, the shear pin can be sheared or ruptured should the other input to the walking beam become jammed, thereby permitting the pilot to control the aircraft with the portion of the walking beam so freed. This is shown in assignees U.S. Pat. No. 3,908,513 to Leoni. It is also known in the control art to utilize springs or other continuously operating mechanism to provide resistance to input commands or signals to the control, such as in Marichal U.S. Pat. No. 556,547, however, such mechanisms continue in operation after the over-control threat has passed and therefore continuously adversely affect normal operation of the control system thereafter.

SUMMARY OF THE INVENTION

A primary object of the present invention is to teach an aircraft flight control system in which the pilot can continue to control the aircraft utilizing the system despite malfunction, such as jamming, of a portion of the system, and which prevents pilot over-control of the aircraft as a result of jamming problems.

In accordance with the present invention, a walking beam is used as part of the linkage array of the flight control system and both a pilot control input and at least one other input are imparted thereto so as to produce an output signal due to the pivot motion of the walking beam and, wherein, the walking beam is made of two pieces which are normally joined through a shear pin so as to normally act as a unitary walking beam and so that, if jamming occurs in the other motion imparting signal to the walking beam, the pilot, by the application of force, can cause the shear pin to shear, thereby freeing the walking beam piece to which his pilot control rod attaches so that the pilot can thereafter manually control the aircraft. The system includes apparatus which prevents initial over-control of the aircraft by the pilot due to his imparting excessive motion and thereby control to the system immediately following shearing of the shear pin.

It is a further feature of this invention that the over-control abatement means is a dash-pot or other ones-troke effective mechanism which will serve to resist the pilot imparted motion to the walking beam following shear pin rupture during the immediate pilot input motion signal following shear pin rupture, and which is inoperative thereafter.

It is a further feature of this invention to teach such a mechanism in which by-pass linkage is not required and which operates to reduce the magnitude of control input resulting from shear pin separation to thereby decelerate control after shear pin separation.

It is a further object of this invention to teach such a control system in which the over-control abatement mechanism is a one-stroke hydraulic or pneumatic cylinderpiston mechanism which is operative for a single pilot imparted stroke between the piston and cylinder and which is inoperative thereafter so as not to adversely affect control "feel".

DESCRIPTION OF THE PREFERRED EMBODIMENT

Figure 1:
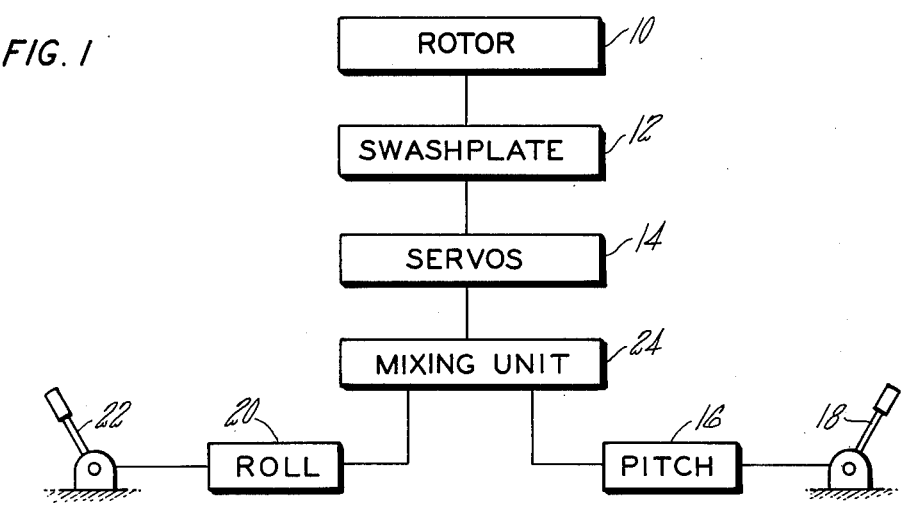
FIG. 1 is a schematic showing of a conventional aircraft flight control system.

Referring to FIG. 1 we see a schematic of a conventional aircraft flight control system of the type used in helicopters. The purpose of such a flight control system is to control helicopter flight by controlling the pitch of the blades of rotor 10 through swashplate member 12 which is positioned by control servos 14. Servos 14 are, in turn, controlled by control inputs thereto such as pitch control input system 16, which includes manual powered control inputs 18, and roll control system 20, which includes manual pilot control input 22, with both the pitch control and roll control signal being imparted to servos 14 through mixing unit 24. This description of aircraft flight control systems is deemed adequate for the present purpose and reference is hereby made to U.S. Pat. Nos. 3,071,335 and 3,839,923 for greater particulars concerning the construction and operation thereof.

Figure 2:
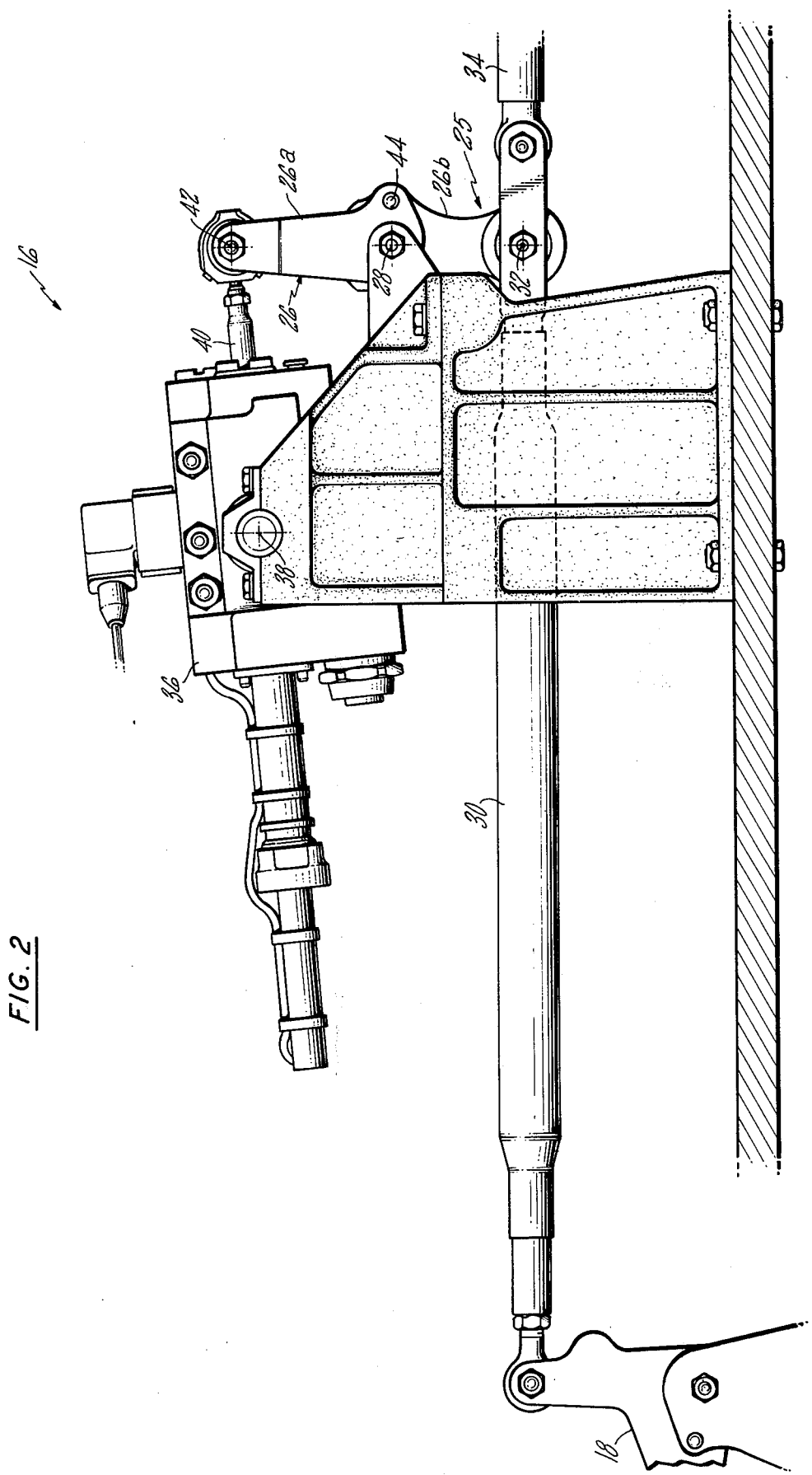
FIG. 2 is a showing of a portion of the flight control system utilizing my invention and depicting the walking beam in its control linkage system environment.

Referring to FIG. 2 we see a portion of pitch control system 16, but it should be borne in mind that the construction of interest could as well be used in roll control system 20 or other control systems of a flight control system and is not limited to a pitch control system. In FIG. 2, we see that control linkage system 25 includes walking beam 26 which is mounted from the aircraft for pivot motion about pivot axis 28 and that pilot input is imparted to walking beam 26 through pilot control rod 30, which pivotally connects to the walking beam at pivot axis 32, and which is preferably manually operated by the pilot input mechanism 18 to cause walking beam 26 to pivot about axis 28 and thereby impart output control motion to output control link 34, which may lead to mixing unit 24 or another part of the flight control system. A second control input is imparted to walking beam 26 through input mechanism 36, which is pivotally supported about pivot axis 38 and which includes reciprocating member 40 which pivotally connects to walking beam 26 at pivot axis 42. Member 40 may be a servo piston rod or other conventional control input mechanism which also causes walking beam 26 to pivot about pivot axis 28 to impart an output signal to output control link 34. While it should be borne in mind that input control mechanism 36 can be any control mechanism which imparts an input signal to walking beam 26, purely for purposes of explanation it is suggested that mechanism 36 could be a FAS (force augmentation system) actuator which operates to impart "feel" to the system so as to let the pilot know whether he is over-controlling the aircraft so that the pilot might take corrective action. By viewing the FIG. 2 construction it will be seen that the pilot may manually or otherwise control the aircraft by actuating pilot control rod 30 to cause walking beam 26 to pivot as described and impart output control motion and signal to output member 34. Input control mechanism 36 is also capable of imparting pivot motion to the walking beam and therefore producing motion to output control member 34. If input control member 36 is a FAS actuator, it is responsive to aircraft loads, imparting a resisting force to walking beam 26 in opposition to the force imposed thereto manually by the pilot through link 30, thereby warning the pilot through his "feel" of the system that he is over-controlling the aircraft. It will also be evident that if input control 36 is inoperative, for example, if servo piston 40 is jammed for any reason, such as malfunction in operation or ballistic damage, that walking beam 26 is immobilized thereby and the pilot will not be able to impart output control motion to mechanism 34 through the pilot actuated input mechanism 30. It will therefore be seen that jamming of servo piston rod 40 or other malfunctioning of input control 36 will incapacitate the flight control system.

To prevent this incapacitation of the system, walking beam 26 is made of two pieces, 26a and 26b, each of which is pivotally connected and supported about pivot axis 28 so as to be pivotable thereabout. Walking beam pieces 26a and 26b are joined through shear pin 44 so that, during normal operation, walking beam 26 is operable as a unitary walking beam. Walking beam 26 may be fabricated as illustrated in U.S. Pat. No. 3,908,513. With this two-piece construction of walking beam 26, should walking beam 26 become immobilized by the jamming or other incapacity of input control 36, the pilot may manually or otherwise apply added force to walking beam 26 through pilot control rod 30 until shear pin 40 shears or fractures, thereby freeing walking beam piece or portion 26b for pilot imparted pivot motion about axis 28 so that the pilot may thereafter provide output control motion to member 34 through the actuation of walking beam piece 26b alone.

Experience has shown that this construction has the disadvantage that, upon the shearing of shear pin 44, the high manually imposed force through control rod 30 to walking beam 26 will cause walking beam piece 26b to move rapidly and impart a very substantial motion to control output member 34, thereby inadvertently over-controlling the aircraft to its potential detriment, due to the excessive control motion which the pilot has inadvertently imparted to the system as a result of the rupturing of shear pin 44 due to the pilot's application of high force to the system through control rod 30.

Figure 3:
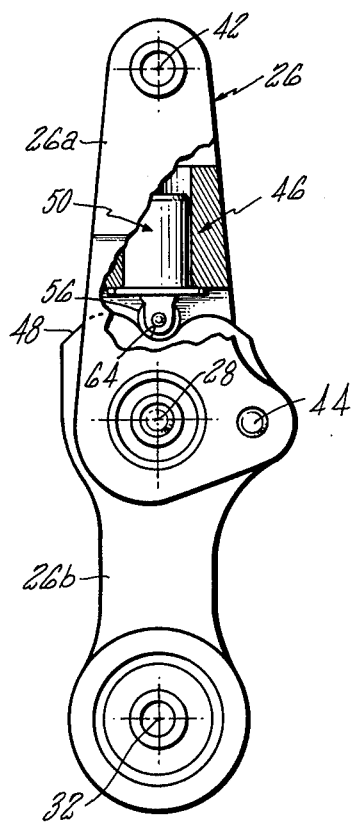
FIG. 3 is a showing of the walking beam separate from the remainder of the control linkage system to illustrate its construction.
Figure 4:
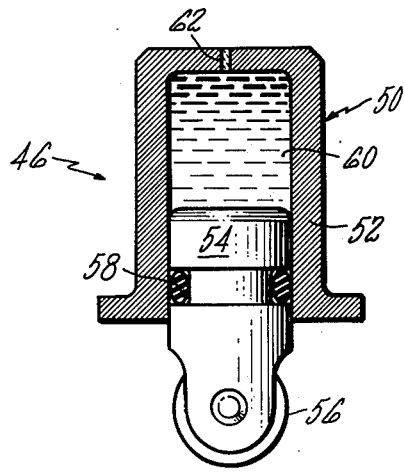
FIG. 4 is a showing of the one-stroke over-control abatement means forming part of this invention.

To avoid this over-control problem walking beam 26 is fabricated as shown in FIGS. 3 and 4. Walking beam 26 includes over-control abatement mechanism 46, which comprises cam member or surface 48 which forms part of walking beam piece 26b and dash-pot or cylinder-piston assembly 50, which is carried by walking beam piece 26a. Cylinder-piston assembly 50 includes cylinder member 52 in which piston 54 may travel. Roller 56 projects from and is carried by piston 54 and O-ring 58 seals chamber 60, which is formed between cylinder 52 and piston 54. Chamber 60 is normally filled with a fluid of selected viscosity so as to provide the desired amount of resistance to the motion of piston 54 within cylinder 52 because such motion will cause the fluid in chamber 60 to be discharged from chamber 60 through selectively sized aperture 62 in the wall of cylinder 52. As best shown in FIG. 3, with shear pin 44 joining walking beam pieces 26a and 26b so that walking beam 26 operates as a unitary walking beam during normal operation, roller 56 engages recess 64 in cam surface 48 and, when pilot force causes shear pin 44 to shear, pivotal motion of walking beam piece 26b about axis 28, either clockwise or counter-clockwise, will cause roller 26 to ride up on cam 48 thereby forcing piston 54 to move within cylinder 52 through chamber 60 so as to discharge the fluid therefrom through aperture 62 in dash-pot fashion and thereby apply a resisting force to the pilot imparted pivot motion to walking beam piece 26b. It will be evident to those skilled in the art that by proper selection of the size of apertures 62 and the viscosity of the fluid in chamber 60, the resisting force generated by over-control abatement mechanism 50 can be closely regulated as desired for the particular flight control system under consideration. The fluid in chamber 60 may be either air, a conventional hydraulic-type, or a viscous fluid. Further, while in out preferred mechanism piston 54 moves within stationary cylinder 52, it will be evident that the cylinder could be made the moving part and the piston held stationary.

It is very important that over-control abatement mechanism 50 operate only during the period when the control system is vulnerable to over-control motion by the pilot. This period of vulnerability is immediately following the rupturing of shear pin 44. Therefore, it is important that mechanism 50 be temporarily operative only and during the period immediately following shear pin fracture because the only pilot input motion which must be abated is the motion which produces the aforementioned pivotal motion of walking beam piece 26b immediately following shear pin rupture. With this initial overcontrol motion abated, it is very important that the pilot be permitted to control the aircraft without continuous interference from and resistance by overcontrol abatement means 50. Accordingly, in our construction, over-control abatement means 50 is a one-stroke cylinder-piston arrangement in which the piston 54 is forced by the coaction of roller 56 and cam 48 into cylinder 52 in dash-pot fashion and in which, due to the fit of piston 54 within cylinder 52 or the action of O-ring seal 58, piston 52 remains in this depressed position within cylinder 54 and hence out of contact with cam 48 of walking beam piece 26b after it has performed its over-control abatement function by resisting this pilot imposed initial pivotal motion of walking beam piece 26b. Thereafter, the flight control system is unaffected by mechanism 50, which is thereafter inoperative.

It will be evident to those skilled in the art that my invention is applicable to any flight control system utilizing a walking beam and which includes an over-control potential brought about by the shearing of a shear pin or similar mechanism by pilot imposed force.

I wish it to be understood that I do not desire to be limited to the exact details of construction shown and described, for obvious modifications will occur to a person skilled in the art.

I claim:

1. An aircraft flight control system having a linkage system including:
   (A) a pivotally supported walking beam,
   (B) control output means operatively connected to said walking beam so as to be actuated by pivot motion of said walking beam,
   (C) first control input means operatively connected to impart motion input to said walking beam to cause said walking beam to pivot and thereby actuate said output means,
   (D) second control input means operatively connected to impart motion input to said walking beam to cause said walking beam to pivot and thereby actuate said output means,
   (E) said walking beam being of two-piece construction with each piece pivotally supported about the walking beam pivot axis and including:
     (1) a shear pin operative to join the two pieces of the walking beam so as to operate as a unitary walking beam during normal operation and so that when one of said input means is jammed to thereby prevent pivot motion of the unitary walking beam, increased input force from the other input means will cause said shear pin to shear and free said walking beam pieces so that the other input means can impart pivot motion to one of said walking beam pieces and thereby actuate said output means, and
     (2) over-control abatement means operative to resist motion input to said walking beam from said other input means after said shear pin shears so as to prevent excessive actuation of said output means.

2. A flight control system accordng to claim 1 wherein said over-control abatement means is fabricated for selectively limited operation.

3. A control system according to claim 2 wherein said over-control abatement means is a one-stroke hydraulic or pneumatic cylinder-piston arrangement fabricated to offer resistance to relative motion between said piston and cylinder for a single stroke therebetween and to be inoperative thereafter.

4. A control system according to claim 3 wherein said over-control abatement means includes a cam mechanism located on one of said walking beam pieces and a hydraulic or pneumatic cylinder-piston assembly located on the other of said walking beam pieces and operatively connected so that when the shear pin shears the relative motion between the walking beam pieces will cause the cam to drive the piston in one-stroke reciprocating motion within the cylinder so as to displace the fluid in the cylinder-piston assembly to perform a motion damping function for a single stroke of the piston within the cylinder in one direction and so that the cylinder remains retracted following that single stroke so as to be out of contact with the cam.

5. A control system according to claim 1 wherein said other input means is a manually imposed pilot input control and so that said jammed input means is a pilot "feel" control.

6. A control system according to claim 3 wherein one of said control input means is connected to one of said walking beam pieces so as to cause it to pivot while the other of said control input means is connected to the other of said walking beam pieces so as to cause it to pivot.

* * * * *